United States Patent

Shoffner

[15] 3,673,204
[45] June 27, 1972

[54] MANUFACTURE OF N-2-ARYLTHIAZOLE SULFENAMIDE

[72] Inventor: James P. Shoffner, Elk Grove Village, Ill.
[73] Assignee: Universal Oil Products Company, Des Plaines, Ill.
[22] Filed: Aug. 22, 1969
[21] Appl. No.: 852,474

[52] U.S. Cl. ..................260/306.6 A, 260/83.3, 260/302 S
[51] Int. Cl. .........................................C07d 91/44
[58] Field of Search..............................260/306.6 A, 302 S

[56] References Cited

UNITED STATES PATENTS 2,581,921  1/1952  Alliger................................260/306.6
3,161,648  12/1964  Rodgers et al......................260/306.6

OTHER PUBLICATIONS

Carr et al., J. Org. Chem., 14, 921–34 (1949).

Primary Examiner—Alex Mazel
Assistant Examiner—R. J. Gallagher
Attorney—James R. Hoatson, Jr. and Bernard L. Kramer

[57] ABSTRACT

N-aryl-thiazolesulfenamide is prepared by oxidative condensation by reacting a mercaptothiazole and an aryl amine in alcohol solvent and alkali metal hypochlorite at a temperature below 0° C. The preferred N-aryl-2-benzothiazole sulfenamide is used to offset the decrease in scorch encountered upon incorporating a phenylenediamine antiozonant in the rubber formulation.

10 Claims, No Drawings

3,673,204

MANUFACTURE OF N-2-ARYLTHIAZOLE SULFENAMIDE

BACKGROUND OF THE INVENTION

Various benzothiazolesulfenamides are presently used as accelerators in the vulcanization of rubber. The sulfenamides being so used are the cycloalkyl, the alkyl or the oxyalkylene derivatives.

Numerous methods are disclosed in the prior art for the preparation of the sulfenamides set forth above. One method is referred to as oxidative condensation and utilizes chlorine, sodium hypochlorite, iodine, hydrogen peroxide, etc. as the oxidizing agent. The temperature used in these preparations is above 0° C. and may range from 5° to 30° C. or more. Another method involves the reaction between benzothiazole sulfur chloride with a primary aliphatic amine. Still another method involves the reaction of metallic thiazoyl mercaptides with N-chloro derivatives of secondary amines. Still another method involves the reaction of a thiazolyl disulfide with an amine. These methods work satisfactorily in varying degrees for the preparation of the specific derivatives hereinbefore set forth by apparently the oxidative condensation process appears to be the preferred method.

Although extensive research has been conducted in connection with the manufacture of various benzothiazolesulfenamides, the prior art is practically silent as to the preparation of the N-aryl-sulfenamide derivatives by the oxidative condensation process. Apparently this silence is due to the fact that the N-aryl derivatives are not prepared by following the conventional oxidative condensation method. This inability to prepare the N-aryl derivatives by the oxidative condensation process is mentioned in the article "Thiazolesulfenamides" by Carr, Smith and Alliger which appeared in J. Organic Chemistry, 14, 921–34 (1949).

The present invention is based on the discovery that N-aryl-benzothiazolesulfenamides can be prepared by the oxidative condensation process provided that certain critical modifications are practiced. These critical modifications include the use of an alkali metal hypochlorite, an alcohol solvent and a temperature of below 0° C. In the absence of these critical requirements, the desired N-aryl-benzothiazolesulfenamide is not produced.

As hereinbefore set forth, the use of an alkali metal hypochlorite is critical. Sodium hypochlorite is preferred. Other alkali metal hypochlorites and particularly potassium hypochlorite may be used but not necessarily with equivalent results. The use of the alkali metal hypochlorite is critical because other conventional oxidizing agents, such as potassium iodide, iodine, hydrogen peroxide, etc., were unsuitable in the preparation of the desired product.

Also, as hereinbefore set forth, the reaction is effected in the presence of an alcohol solvent. Methanol is particularly preferred. Other alcohol solvents include ethanol, propanol, butanol, etc.

Also, as hereinbefore set forth, the reaction temperature must be below 0° C. and thus may range from —20° to 0° C. and preferably is within the range of —10° to 0° C., although even lower temperatures may be used if advantages appear therefor. However, the reaction proceeds satisfactorily at a temperature of —10° to —5° C. so that generally there will be no necessity to utilize lower temperatures.

In a preferred embodiment, mercaptobenzothiazole is utilized as a reactant. However, it is understood that other thiazoles may be used as, for example, 2-mercapto-4,5-dimethylthiazole, 2-mercapto-4-ethylthiazole, 2-mercaptonaphthothiazole, 2-mercapto-4-phenylbenzothiazole, 2-mercapto-methylbenzothiazole, etc., but not necessarily with equivalent results.

Any suitable aromatic amine is used as a reactant. The different aromatic amines may impart different properties to the final product and thus the particular aryl amine will be selected with reference to the ultimate use of the sulfenamide. Illustrative aromatic amines include aniline, p-methylaniline, p-methoxyaniline, p-chloroaniline, etc. Other substituted anilines include o, m and p-alkylanilines in which the alkyl contains from one to six carbon atoms and 2,3-, 2,4-, 2,5-, 2,6-, 3,4- or 3,5- dialkylaniline, each alkyl containing one to six carbon atoms. Corresponding naphthyl amines may be used to prepare the N-naphthyl derivatives.

The oxidative condensation may be effected in any suitable manner with the critical modifications hereinbefore set forth. In a preferred method the alkali metal thiazole and particularly sodium mercaptobenzothiazole is prepared first and then is reacted with the aryl amine under the critical conditions herein set forth. The thiazole and aryl amine are reacted in equal mole proportions but generally an excess of the aryl amine is used and may range up to 5-mole proportions thereof per mole proportion of the thiazole. The alkali metal hydroxide is used initially to form the alkali metal mercaptobenzothiazole and will be used in at least equal mole proportions but a slight excess up to 10 percent may be employed. In a particularly preferred method, mercaptobenzothiazole, aryl amine and sodium hydroxide are dissolved in the alcohol solvent, and the solution is cooled to a temperature of below 0° C. Any suitable method of cooling may be used and, in one method, comprises an ice-alcohol bath. Commercial Formula 30, comprising a mixture of methanol and ethanol, may be used with ice as the cooling medium. The cooled solution then is slowly added to an aqueous solution of alkali metal hypochlorite and preferably of sodium hypochlorite which previously had been chilled to a temperature of below 0° C. The alkali metal hypochlorite is used in sufficient concentration and may range from equal molar and preferably an excess up to 25 molar percent of the thiazole is used. As mentioned above the sodium hypochlorite preferably is prepared as a solution in cold water and may comprise from 5 to 40 percent and preferably from 5 to 15 percent by weight of the hypochlorite.

The commingling of the reactants is accompanied by stirring, after which the mixture preferably is stirred for an additional time to complete the reaction. The additional stirring will be continued for the desired time which may range from 15 minutes to 1 hour or more. After completion of the reaction, the reaction mixture is filtered and the sulfenamide product is recovered as a solid product. The solid product may be used as such or, when desired, it may be purified in any conventional manner.

As hereinbefore set forth, the N-aryl-benzothiazolesulfenamide is used to offset the decrease in scorch time encountered when a phenylenediamine antiozonant is incorporated in the rubber formulation. However, as hereinbefore set forth, the different substituted aryl derivatives possess different specific properties and thus the particular derivative to be used will be selected with reference to the particular rubber properties desired. In some cases the elongation properties are of more importance than the other properties as, for example, the tensile strength. The specific properties appear to be related to the basicity of the amine.

The sulfenamide will be used in the rubber formulation in conventional proportions, which may range from 0.5 to 3 and preferably from 1 to 2 parts of the sulfenamide per 100 parts of the rubber hydrocarbon in the formulation. The sulfenamide of the present invention is incorporated in the rubber formulation in any suitable manner and conveniently is incorporated during milling of the various ingredients into the rubber hydrocarbon. The various ingredients include in addition to the sulfenamides of the present invention, carbon, zinc oxide, sulfur, stearic acid, antioxidant, antiozonant, etc., all of these being used in conventional concentrations. Following the mixing, the mixture is subjected to vulcanization in conventional manner.

The following examples are introduced to illustrate further the novelty and utility of the present invention but not with the intention of unduly limiting the same.

EXAMPLE I

The sulfenamide of this example is the N-phenylsulfenamide of mercaptobenzothiazole. It was prepared by forming a solution in methanol of 34 g. (0.2 mole) of mercaptobenzothiazole, 46.5 g. (0.5 mole) of aniline and 20 ml. of a 50 % aqueous solution of sodium hydroxide and cooling the solution to −8° C. in an ice-alcohol bath. The alcohol used was commercial Formula 30. A separate solution (150 ml.) of commercial 10 percent by weight of sodium hypochlorite was chilled to −8° C. The second solution was added dropwise over a period of 20 minutes into the first solution, with continuous stirring. The mixture was stirred for an additional 30 minutes and then filtered. There was recovered 10.5 g. of solid material comprising the desired sulfenamide. The sulfenamide was purified by elution from a column of alumina (75 g. of 60—200 mesh) with ether (1.5 liter) to yield N-phenyl-benzothiazolesulfenamide, having a melting point if 126°—129° C. The composition of the product was confirmed by NMR (nuclear magnetic resonance) and IR (infrared) analyses.

EXAMPLE II

N-p-methylphenylbenzothiazolesulfenamide was prepared in substantially the same manner as described in Example I. In this preparation, 34 g. (0.2 mole) of mercaptobenzothiazole, 53.5 g. (0.5 mole) p-methylaniline and 20 ml. of a 50 percent solution of sodium hydroxide were dissolved in methanol (200 ml) and cooled to −8° C. in an ice-Formula 30 alcohol bath. A separately prepared 10 percent solution of sodium hypochlorite (150 ml) which previously had been chilled to −8° C. was added dropwise to the first solution over a period of 20 minutes while being stirred and the stirring was continued for an addition 30 minutes, after which the mixture was filtered. The N-p-methylphenylbenzothiazolesulfenamide was recovered as a solid in an amount of 12 g. Here again the sulfenamide was purified by elution from a column of alumina with ether in the same manner as described in Example I. The product had a melting point of 144°—146° C. The composition of the product was characterized by NMR and IR as described in Example I.

EXAMPLE III

The sulfenamide of this example is N-p-methoxyphenyl-benzothiazolesulfenamide and was prepared in substantially the same manner as described in the previous examples. In this specific example, 34 g. (0.2 mole) of mercaptobenzothiazole, 62 g. (0.5 mole) of p-methoxyaniline and 20 ml. of 50 percent solution of sodium hydroxide were dissolved in methanol and cooled to −8° C. in the ice-alcohol bath. A 10 percent solution of sodium hypochlorite (150 ml) which previously had been chilled to −8° C. was added dropwise to the first solution over a period of 20 minutes with continuous stirring and followed by additional stirring for 30 minutes, after which the mixture was filtered and the solid product purified and characterized in the same manner as described in Example I. The N-p-methoxyphenylbenzothiazolesulfenamide was recovered in a yield of 13 g. and had a melting point of 119°—121° C.

EXAMPLE IV

N-p-chlorophenyl-benzothiazolesulfenamide was prepared in substantially the same manner as described in Example I except that p-chloroaniline was charged in a concentration of 64 g. (0.5 mole). The solid product was purified by elution in the same manner as described in Example I.

EXAMPLE V

As hereinbefore set forth, the use of the alkali metal hypochlorite is critical. This is illustrated in the present example in which a preparation similar to that described in Example I was attempted using potassium iodide instead of sodium hypochlorite. Under the same reaction conditions as described in Example I, the desired N-phenyl-benzothiazolesulfenamide was not produced. Instead there was produced a very dark solution, probably resulting from considerable oxidation of the aniline and 2,2'-dithio-bis-benzothiazole.

EXAMPLE VI

Still another run was made in a similar manner as described in Example I except that hydrogen peroxide was used instead of sodium hypochlorite. Here again the desired N-phenyl-benzothiazolesulfenamide was not produced. Instead there was produced only a clear solution which contained none of the desired product.

EXAMPLE VII

As hereinbefore set forth it is essential that an alcohol solvent be used in the preparation. Another preparation was attempted in the same manner as described in Example I except that dimethyl formamide was used instead of the methanol solvent. It was found that the dimethyl formamide oxidized and the desired N-aryl-benzothiazolesulfenamide was not produced.

EXAMPLE VIII

As hereinbefore set forth the reaction temperature must be below 0° C. in order to effect the desired preparation. This is illustrated in the present example in which a run was made in substantially the same manner as described in Example I except that the reactants were not precooled to below 0° C. The reactants were mixed and stirred at room temperature (25° C.). The desired N-phenyl-benzothiazolesulfenamide was not produced. Instead there was produced 2,2'-dithio-bis-benzothiazole.

EXAMPLE IX

As hereinbefore set forth, other methods were investigated and found to be inoperative for the preparation of the N-aryl-benzothiazolesulfenamide. The method attempted in this example was the reaction of 2 -benzothiazole sulfenylchloride with aniline. In the reaction a solution of 2 -benzothiazolesulfenychloride was prepared by treating a solution of 2,2'-dithio-bis-benzothiazole (33.2g. 0.1 mole) in methylene chloride (500 ml) with chlorine gas (7.1 g). The sulfenyl chloride so prepared was chilled to −8° C. and treated with a solution of aniline (28 g., 0.3 mole) in methylene chloride (100 ml). The precipitate was filtered and the solution concentrated. The major product of this reaction was starting material and considerable decomposed materials.

When the reaction is run at ambient temperature without cooling, the reaction cannot be controlled and decomposition is even more severe.

EXAMPLE X

N-phenyl-2-mercapto-4,5-dimethylthiazolesulfenamide is prepared in substantially the same manner as described in the previous examples by forming a solution in ethanol of 0.2 mole of 2-mercapto-4,5-dimethylthiazole and 0.5 mole of aniline in 20 ml. of a 50 percent aqueous solution in potassium hydroxide and cooling the solution to −5° C. in an ice-Formula 30 alcohol mixture. A previously formed separate solution (150 ml.) of 10 percent by weight of potassium hypochlorite, which also had been chilled to −5° C., is added dropwise over a period of 20 minutes into the first solution, with continuous stirring. The mixture is stirred for an additional 45 minutes and then filtered. The solid material is recovered as the desired N-phenyl-4,5-dimethyl-thiazolesulfenamide.

EXAMPLE XI

As hereinbefore set forth, the N-aryl-benzothiazolesulfenamide serves to offset the decrease in scorch time encountered when a phenylenediamine antiozonant is incorporated in the rubber formulation. It is desirable and often necessary to incorporate a phenylenediamine antiozonant into the rubber formulation in order to protect the rubber from deterioration due to ozone attack.

This example reports the Mooney scorch properties of an SBR (styrene-butadiene-rubber) formulation in which various N-aryl-benzothiazolesulfenamides were incorporated, all at a concentration of 1.25 phr (parts per 100 parts of rubber hydrocarbon). For comparative purposes the results obtained when using N-cyclohexylbenzothiazole-2-sulfenamide also are reported. As mentioned above, N-cyclohexylbenzothiazole-2-sulfenamide is presently used on a large scale in commercial manufacture of rubber products.

The rubber formulation used in these runs was of the following recipe:

| Ingredient | Parts by Weight |
| --- | --- |
| SBR 1502 | 100 |
| Furnace Black | 40 |
| Zinc Oxide | 3 |
| Stearic Acid | 2 |
| Sulfur | 2 |
| Sulfenamide | 1.25 |
| Antiozonant (when used) | 3.32 |

The ingredients were incorporated by conventional milling procedure and the formulation was cured for 40 minutes at 40° C.

The scorch values were determined with the large rotor Mooney viscometer at 250° F. (ASTM D-1077-55T). The values represent the number of minutes for a rubber containing a curing agent to increase viscosity by 5 and then 20 pounds. This method simulates conditions encountered during milling. Thus, a high scorch value indicates a high resistance to scorching.

The data in the following table reports the results of the evaluations.

| Run No. | Benzothiazole Sulfenamide | Antiozonant* | Mooney Scorch 5 pt. rise | 20 pt. rise |
| --- | --- | --- | --- | --- |
| 1 | N-cyclohexyl | No | 56.1 | 60.8 |
| 2 | N-cyclohexyl | Yes | 18.0 | 20.5 |
| 3 | N-phenyl | No | 82.6 | 115.2 |
| 4 | N-phenyl | Yes | 48.0 | 56.4 |
| 5 | N-p-methylphenyl | No | 80.4 | 105.6 |
| 6 | N-p-methylphenyl | Yes | 43.7 | 49.8 |
| 7 | N-p-methoxyphenyl | No | 67.1 | 78.5 |
| 8 | N-p-methoxyphenyl | Yes | 30.9 | 35.1 |

*N'-di-2-octyl-p-phenylenediamine

As mentioned above, the sulfenamides were used in a concentration of 1.25 phr. The antiozonant was used in a concentration of 3.32 phr.

Referring to the data in the above table, it will be seen that the sulfenamides of the present invention offset the decrease in scorch encountered upon the addition of the antiozonant into the rubber formulation. For comparative purposes, it will be noted that this decrease in scorch time was considerably less than when using N-cyclohexyl-benzothiazolesulfenamide.

EXAMPLE XII

Also of importance is the proper curing of the rubber formulation in order to prepared a product of the desired physical properties. The specific physical properties desired will depend upon the ultimate use of the rubber product. For example, the ultimate elongation is an important requirement.

In the preparation as described in Example XI, the sample containing the same phenylenediamine antiozonant and N-cyclohexyl-benzothiazolesulfenamide had an ultimate elongation of 550 percent. The samples containing the same antiozonant and the N-phenyl, N-p-methylphenyl and N-p-methoxyphenyl derivatives had ultimate elongations of 445 percent, 520 percent and 575 percent, respectively. Accordingly, for this requirement the N-p-methoxy derivative would be preferred.

EXAMPLE XIII

When considering tensile strength of the rubber product as an important requirement, the N-p-methoxyphenyl derivative also appears best of the N-aryl derivatives. The sample containing the same phenylenediamine antiozonant and the N-p-methoxyphenyl-benzothiazolesulfenamide had a tensile strength of 2,780 pounds. This is only slightly less than the tensile strength of 3,000 pounds in the product containing the same phenylenediamine antiozonant and N-cyclohexyl-benzothiazolesulfenamide.

I claim as my invention:

1. A process for preparing an N-aryl-thiazolesulfenamide by oxidative condensation which comprises reacting a mercaptothiazole and an aryl amine selected from the group consisting of aniline and alkyl, methoxy and chloro-substituted anilines in an alcohol of from one to four carbon atoms per molecule and an alkali metal hypochlorite at a temperature below 0° C.

2. The process of claim 1 in which the thiazole is mercaptobenzothiazole and the sulfenamide is N-aryl-benzothiazolesulfenamide.

3. The process of claim 1 in which said aryl amine is aniline.

4. The process of claim 1 in which said alcohol is methanol.

5. The process of claim 1 in which said aryl amine is p-methylaniline.

6. The process of claim 1 in which said aryl amine is p-methoxyaniline.

7. The process of claim 1 in which said aryl amine is p-chloroaniline.

8. The process of claim 2 in which said alkali metal hypochlorite is sodium hypochlorite.

9. The process of claim 2 in which said temperature is from −20° to 0° C.

10. The process of claim 2 in which said temperature is from −10° to 0° C.

* * * * *